United States Patent [19]
Grubert et al.

[11] 3,876,596
[45] Apr. 8, 1975

[54] EMULSION COPOLYMERIZATION OF MONOOLEFINICALLY UNSATURATED CARBOXYLIC ACID ESTERS

[75] Inventors: Heinrich Grubert, Mannheim; Wolfgang Druschke, Dirmstein; Wolfgang Sliwka, Weinheim, all of Germany

[73] Assignee: Basf Aktiengesellschaft, Ludwigshafen/Rhine, Germany

[22] Filed: Nov. 13, 1973

[21] Appl. No.: 415,293

[30] Foreign Application Priority Data
Nov. 16, 1972  Germany............................ 2256154

[52] U.S. Cl..... 260/89.5 AW; 260/17 A; 260/17 R; 260/29.6 BE; 260/29.6 WA; 260/80 M; 260/89.5 R
[51] Int. Cl. .............................................. C08f 3/62
[58] Field of Search ....... 260/17 A, 17 R, 29.6 WA, 260/29.6 BE, 89.5 AW

[56] References Cited
UNITED STATES PATENTS
3,218,302  11/1965  Melamed .............................. 260/80

OTHER PUBLICATIONS
Chem. Abst. 59; 13019a, Scatena et al., "Aqueous Vinyl Acetate Polymer Emulsions."

*Primary Examiner*—Morris Liebman
*Assistant Examiner*—Edward Woodberry

[57] ABSTRACT

In the manufacture of aqueous dispersions of polymers of monoolefinically unsaturated carboxylic acid esters by emulsion copolymerization, polymerization is effected in the presence of a mixture of (a) non-ionic emulsifiers, (b) anionic emulsifiers, (c) a protective colloid based on an N-vinyl pyrrolidone polymer and (d) a hydroxyl-containing protective colloid.

9 Claims, No Drawings

EMULSION COPOLYMERIZATION OF MONOOLEFINICALLY UNSATURATED CARBOXYLIC ACID ESTERS

Aqueous dispersions of polymers of monoolefinically unsaturated carboxylic acid esters are produced in large quantities by emulsion copolymerization of monoolefinically unsaturated carboxylic acid esters, such as vinyl acetate and/or acrylic esters, optionally together with carboxyl-containing monomers such as, in particular, $\alpha,\beta$-monoolefinically unsaturated carboxylic acids. In general, use is made of water-soluble free-radical polymerization initiators such as water-soluble peroxide compounds, e.g., hydrogen peroxide, persulfates such as potassium, sodium and ammonium persulfates, or in some cases perborates, as caralysts. The emulsifiers generally used are ionic and/or non-ionic emulsifiers such as polyglycol ethers, sulfonated paraffin hydrocarbons, higher alkyl sulfates such as lauryl sulfate, alkali metal salts of fatty acids such as sodium stearate and sodium oleate, sulfuric acid esters of fatty alcohols, ethoxylated $C_{8-12}$ alkyl phenols, usually having from 5 to 30 ethylene oxide radicals, and their sulfonation products and also sulfosuccinic acid esters in amounts usually of from 0.1 to 5.0% w/w based on the monomers. In many cases use is also made of a protective colloid, examples of which are polyvinyl alcohol, partially saponified polyvinyl acetates, cellulose derivatives, copolymers of methyl acrylate with acrylamide and methacrylamide or vinyl pyrrolidone polymers in amounts of from about 0.5 to 10% and in particular from 1.0 to 5% by weight of the weight of monomers.

If, in the emulsion copolymerization of monoolefinically unsaturated carboxylic acid esters, use is made of small amounts of a protective colloid in addition to the usual emulsifiers, there are produced copolymer dispersions having a high viscosity depending on the type of protective colloid used, which dispersions are particularly suitable as starting materials for adhesives and paint. However, the flowability of the highly viscous dispersions is usually unsatisfactory. Another practical difficulty is the problem of reproducing dispersions having the same viscosity and the same flow characteristics, particularly when the monomers, emulsifiers and/or protective colloids contain even small percentages of impurities. It is often then necessary to carry out laborious tests in which the system of auxiliaries, including the comonomers included in the polymerized structure in small quantities, must be varied. Moreover, it is often not possible to increase the viscosity of an aqueous copolymer dispersion of given recipe simply by increasing the amount of protective colloid therein, since a limiting viscosity is often reached when only small amounts of a given protective colloid are added. On the other hand, if it is desired to reduce the viscosity of a dispersion of given recipe, this is not always possible by reducing the amount of protective colloid therein, since the presence of too small an amount of protective colloid usually leads to impairment of the reproducibility of the polymer mixture and to insufficient stability of the aqueous copolymer dispersion.

There is thus a practical need for an emulsion polymerization process for the manufacture of aqueous dispersions of polymers of monoolefinically unsaturated carboxylic acid esters, of which the viscosity and flow behavior may be easily regulated over a very large range, in which process fluctuations in viscosity caused by small amounts of impurities in the reactants may be easily corrected.

We have now found that aqueous dispersions of polymers of monoolefinically unsaturated carboxylic esters may be advantageously prepared by emulsion copolymerization of mono-olefinically unsaturated carboxylic esters using conventional polymerization initiators, emulsifiers and protective colloids at usual temperatures, provided that polymerization is carried out in the presence of a. from 0.5 to 7% of non-ionic emulsifiers.
b. from 0.05 to 5% of anionic emulsifiers,
c. from 0.01 to 5% of a protective colloid based on an N-vinyl pyrrolidone polymer and
d. from 0.01 to 7% of a hydroxyl-containing protective colloid, these percentages being by weight of the total weight of monomers and components (c) and (d) being distinguished by at least 30% of their weight consisting of polymerized units of N-vinyl pyrrolidone.

Mono-olefinically unsaturated carboxylic esters, which are used in our novel process in an amount of at least 40% and in particular from 50 to 99% by weight of the weight of total monomers, generally contain from 3 to 20 carbon atoms and preferably from 4 to 14 carbon atoms and are derived from saturated or monoolefinically unsaturated carboxylic acids. Thus suitable esters are vinyl esters such as vinyl formate, vinyl acetate, vinyl propionate, vinyl n-butyrate, vinyl laurate and vinyl stearate, and vinyl esters of branched-chain saturated carboxylic acids such as vinyl pivalate and/or acrylic and/or methacrylic acid esters of $C_{1-18}$ and in particular $C_{2-12}$ straight-chain or branched-chain alkanols. Other suitable monoolefinically unsaturated carboxylic esters are the dialkyl esters of mono-olefinically unsaturated $C_{4-5}$ dicarboxylic acids such as maleic acid, fumaric acid and itaconic acid, which usually contain from 1 to 12 and in particular from 1 to 8 carbons in the alkyl radicals. Monoalkyl esters of such monoolefinically unsaturated dicarboxylic acids are also suitable, but these are not generally present in an amount of more than 8% of the total weight of monomers. Examples of suitable monoolefinically unsaturated alkyl carboxylates are, above all, methyl acrylate and methacrylate, ethyl acrylate and methacrylate, n-butyl acrylate and methacrylate, t-butyl acrylate, n-hexyl acrylate and methacrylate, 2-ethylhexyl acrylate and methacrylate, dimethyl maleate, di-n-butyl maleate, diethyl maleate, diethylhexyl maleate, diethyl fumarate, di-2-ethylhexyl fumarate, di-n-butyl fumarate and di-n-butyl itaconate and also decyl acrylate, dodecyl acrylate and stearyl acrylate. A particularly preferred vinyl ester is vinyl acetate.

Particularly advantageous results are obtained when small amounts of $\alpha,\beta$-olefinically unsaturated mono- and/or di-carboxylic acids are copolymerized with the above esters. This not only improves the stability of the resulting dispersions and the adhesion of films made therefron on flat substrates but also, surprisingly, improves the flow behavior of the dispersion.

Suitable $\alpha,\beta$-monoolefinically unsaturated carboxylic acids, which are generally copolymerized in amounts of from 0.5 to 15% and preferably from 1 to 5% by weight of total monomer and which usually contain 3 to 5 carbons, are, in particular, acrylic acid, methacrylic acid and crotonic acid and also maleic acid, fumaric acid and itaconic acid. Other suitable $\alpha,\beta$-monoolefinically unsaturated carboxylic acids are monoalkyl esters of said dicarboxylic acids containing $C_{1-4}$ alkyl radicals.

In addition to the mono-olefinically unsaturated carboxylic esters and the $\alpha,\beta$-monoolefinically unsaturated carboxylic acids, there may also be used, in amounts of up to 60% by weight of total monomer, other olefinically unsaturated monomers such as vinyl chloride, vinylidene chloride and ethylene, and, particularly, in the copolymerization of acrylic esters, monovinylaromatic monomers such as in particular styrene, and also $\alpha$-methylstyrene, vinyl toluenes and o-chlorostyrene and also acrylonitrile. Such comonomers are usually used in amounts of from 10 to 40% by weight of total monomer. Of particular interest are copolymers of vinyl acetate with vinyl chloride and copolymers of acrylic esters such as ethyl acrylate, n-butyl acrylate and 2-ethylhexyl acrylate with styrene and/or acrylonitrile, which contain for example from 40 to 60% of acrylic ester and from 40 to 60% of styrene and/or acrylonitrile in addition to from 1 to 6% of their weight of olefinically unsaturated monoor dicarboxylic acids such as acrylic acid or itaconic acid, as polymerized units.

Finally, in our novel polymerization process, it is possible to use minor quantities, for example up to 10% by weight and usually from 0.1 to 5% by weight, of other mono-or di-olefinically unsaturated monomers containing reactive or crosslinking groups. Examples of such monomers are in particular the amides of $\alpha,\beta$-olefinically unsaturated $C_{3-5}$ carboxylic acids, particularly acrylamide, methacrylamide and maleic diamide, and their N-methylol derivatives such as N-methylol acrylamide, N-methylol methacrylamide, N-alkoxy methyl amides of $\alpha,\beta$-monoolefinically unsaturated $C_{3-5}$ carboxylic acids such as N-methoxy methacrylamide and N-n-butoxy methyl acrylamide, vinylsulfonic acid, monoesters of acrylic and methacrylic acids with alkane diols such as glycol, butanediol-1,4, hexanediol-1,6 and 3-chloropropanediol-1,2 and also allyl and methallyl esters of $\alpha,\beta$-olefinically unsaturated mono- and di-carboxylic acids such as diallyl maleate, dimethallyl fumarate, allyl acrylate and allyl methacrylate, diallyl phthalate, diallyl terephthalate, p-divinyl benzene, methylene-bis-acrylamide and ethylglycol diallyl ether.

In our novel process the above monomers are polymerized under the usual conditions of temperature and pressure, i.e. at atmospheric pressure and in general at temperatures of from 0° to 100°C and in particular from 20° to 100°C and preferably from 40° to 90°C and at pH's generally of from 1.5 to 8.5 and preferably from 2.5 to 7. Particularly suitable polymerization initiators are water-soluble peroxides capable of disintegrating into free radicals, e.g., persulfates such as ammonium, sodium and potassium persulfates, hydrogen peroxide, perborates and percarbonates. The amount of such peroxide catalysts is generally between 0.03 and 2% by weight of the total weight of monomers. If polymerization is carried out at low temperature, use may be made of conventional redox catalysts. For example, it is possible to use, in addition to the peroxide catalysts of the above kinds, from 0.005 to 2%, based on the total monomers, of reducing agents such as hydrazine, soluble oxidizable sulfoxy compounds such as alkali metal salts of hydrosulfites, sulfoxylates, thiosulfates, sulfites and bisulfites, which may be optionally activated by the addition of traces of heavy metals in the usual manner.

Furthermore, it is possible to use conventional chain stoppers in conventional amounts.

Our novel process may be carried out continuously or batchwise, and it is possible to employ the usual methods of batchwise polymerization, e.g. mixing all polymerization components at once or feeding emulsified monomers and catalysts from one or more metering vessels to a batch containing a portion of the monomers. Polymerization is carried out in our novel process generally so as to give K values of the resulting polymers of from 30 to 150, as usual.

The characteristic feature of our novel process is that the olefinically unsaturated carboxylic esters are copolymerized with the olefinically unsaturated carboxylic acids in the presence of a specific emulsifier/protective colloid system. This system consists of a. from 0.05 to 7% and in particular from 1.5 to 4% of non-ionic emulsifiers such as, in particular, alkoxylated and preferably ethoxylated fatty alcohols, fatty amines, fatty acid amides and/or monalkyl phenols usually containing $C_{8-12}$ alkyl groups and also containing from 5 to 30 and in particular from 10 to 25 ethylene oxide units, e.g., ethoxylated lauryl alcohol, oleyl alcohol, sperm oil alcohol and stearyl alcohol, ethoxylated oleic and stearic amides, ethoxylated oleyl amide, ethoxylated stearic and oleic acids, ethoxylated p-n-nonyl phenol and ethoxylated p-n-dodecyl phenol, and b. from 0.05 to 5% and in particular from 0.2 to 4% anionic emulsifiers, preferred examples being sulfuric acid esters of fatty alcohols such as lauryl sulfate, sulfonation products of alkoxylated and in particular ethoxylated alkyl phenols usually containing $C_{8-12}$ alkyl groups, such as, in particular, p-n-nonyl phenol, p-n-decyl phenol, water-soluble alkali metal salts of fatty acids such as sodium stearate and potassium oleate, and c. from 0.01 to 5% and in particular from 0.05 to 3% of a protective colloid based on an N-vinyl pyrrolidone polymer usually having a K value of from 30 to 150 and in particular of from 50 to 100 and generally containing at least 20% and preferably from 40 to 100% by weight of polymerized units of vinyl pyrrolidone and which may contain as comonomer $\alpha,\beta$-monoolefinically unsaturated mono- and di-carboxylic acids usually containing from 3 to 5 carbons and/or their amides such as, in particular, acrylamide and methacrylamide, and also amounts of up to 30% by weight of lower acrylic esters such as, in particular, methyl acrylate and/or lower vinyl esters such as, in particular, vinyl acetate and vinyl propionate, and d. from 0.01 to 7% and in particular from 0.5 to 5% of a hydroxylcontaining protective colloid such as, in particular, polyvinyl alcohols, water-soluble and partially saponified vinyl acetate polymers, carboxymethyl celluloses and hydroxy-ethyl celluloses, the above percentages of components (a) to (d) being based on the total weight of monomers present.

Systems of dispersing agents which have proved particularly successful are those containing ethoxylated alkyl phenols and/or ethoxylated alcohols as components (a), $C_{6-14}$ alkyl sulfates, sulfonation products of ethoxylated p-($C_{8-12}$alkyl) phenols containing 5 to 30 ethylene oxide radicals as component (b), one or more copolymers of from 40 to 100% by weight of N-vinyl pyrrolidone and from 10 to 60% by weight of acrylic and/or methacrylic acid and/or acrylamide and/or methacrylamide, as component (c).

The systems of dispersing agents of the invention make it possible to manufacture highly viscous aqueous dispersions of polymers of monoolefinically unsaturated carboxylic esters of which the viscosity and flow behavior may be regulated over a relatively large range by altering the ratio of component (c) to component (d) at a given ratio of component (a) to component (b). An increase (decrease) of the proportion of protective colloid (c) causes an increase (decrease) in viscosity, whilst an increase in the proportion of protective colloid (d) causes an increase in the flowability of the dispersion. By altering the ratio of the emulsifiers (a) and (b), the system of dispersing agents may be made to suit various monomer compositions in the usual manner.

Our novel process makes it possible in a particularly simple manner to produce aqueous dispersions of optionally carboxyl-containing polymers of monoolefinically unsaturated carboxylix esters, which show particularly well-reproducible viscosity and flowability and to counteract in a simple manner any fluctuations in the composition of monomers and auxiliaries (impurities) having an effect on these properties.

In the following Examples the parts and percentages are by weight. The K values were determined by the method proposed by H. Fikentscher in Cellulosechemie 13 (1932), pp. 58 et seq.

polymerization was carried out in all cases in cylindrical vessels equipped with an anchor agitator, reflux condenser and two feed vessels. Pre-emulsified components were fed to the main vessel. The stirrer speed was 120 rpm. in all cases. All of the dispersions obtained were completely polymerized and had a solids content of 50% ± 1%.

Composition of protective colloids used

Protective colloid A
  cellulose modified with 2.5 moles of ethylene oxide per mole, K value (in water) about 120.
Protective colloid B
  polyvinyl alcohol prepared by 98% hydrolysis of polyvinyl acetate followed by acetalization with 4% of butyraldehyde, K value (in water) about 60.
Protective colloid C
  polyvinyl alcohol prepared by 90–93% hydrolysis of polyvinyl acetate, K value (in water) about 70.
Protective colloid D
  copolymer of 70 parts of vinyl pyrrolidone and 30 parts of methacrylamide, K value (in water) about 100.
Protective colloid E
  homopolymer of vinyl pyrrolidone, K value (in water) about 30.

Composition of emulsifiers used

Emulsifier I:
  adduct of 25 moles of ethylene oxide and 1 mole of p-isooctyl phenol.
Emulsifier II:
  adduct of 25 moles of ethylene oxide and 1 mole of $C_{18}$ fatty alcohol.
Emulsifier III:
  adduct of 22 moles of ethylene oxide and 1 mole of HD-ocenol.
Emulsifier IV:
  sodium salt of the sulfuric acid monoester of the adduct of 1 mole of p-isooctyl phenol and 25 moles of ethylene oxide.
Emulsifier V:
  sodium salt of the sulfuric acid monoester of the adduct of 1 mole of p-nonyl phenol and 25 moles of ethylene oxide (Steinapol K-1052 by Rewo).

EXAMPLE 1

| a | b | c | d | |
|---|---|---|---|---|
| 21.75 | 19.5 | 16.5 | 13.5 | parts of protective colloid C |
| 0.75 | 3 | 6 | 9 | parts of protective colloid D |

3.0 parts of emulsifier V
30 525 parts of water and
2.25 parts of $K_2S_2O_8$
pH adjusted to 6.5.

Feed 1

750 parts of vinyl acetate
750 parts of vinyl 2-ethylhexanate
7.5 parts of crotonic acid
1.5 parts of emulsifier III
37.5 parts of emulsifier V
900 parts of water.

The mixture is first neutralized with concentrated aqueous $NH_3$ without the addition of the two esters, whereupon vinyl and vinyl 2-ethylhexanate are added and the mixture is emulsified.

Feed 2

150 parts of water
9 parts of $K_2S_0O_8$.

Procedure

Polymerization is carried out at 75°C. When the initial batch has reached 75°C, 2% of feed 1 is added and polymerization is started over 10 minutes. The remainder of feed 1 is then added over 4 hours and feed 2 over 4.25 hours. Polymerization is then completed over the next 1.25 hours. The batch is then cooled and adjusted to pH 6.5 with concentrated aqueous $NH_3$.

The K value (in cyclohexanone) is between 55 and 66.

Viscosities in poise, measured in a rotary viscometer with elements MV-II, velocity grade 162

| | |
|---|---|
| a | 15.2 |
| b | 20.6 |
| c | 35.2 |
| d | 55.4 |

The dispersions flow from a glass rod and are suitable for use as adhesives for, say, adhesive sheeting and floor coverings.

EXAMPLE 2

Initial batch
3.0 parts of emulsifier I
0.15 parts of t-dodecyl mercaptan
525 parts of water
1.5 parts of $K_2S_2O_8$.
The pH is adjusted to 6.5.

Feed 1

1,500 parts of ethyl acrylate
105 parts of acrylic acid
7.5 parts of sodium vinylsulfonate
30 parts of emulsifier I
7.5 parts of emulsifier IV
3.0 parts of t-dodecyl mercaptan
1,000 parts of water
protective colloids as follows:

| a | b | c | d | e | f | |
|---|---|---|---|---|---|---|
| 13.5 | 12 | 10.5 | 9 | 7.5 | 6 | parts of protective colloid B |
| 1.5 | 3 | 4.5 | 6 | 7.5 | 9 | parts of protective colloid D |

This mixture is first neutralized with concentrated $NH_3$ to a pH of 7.0 without the ethyl acrylate, whereupon the ethyl acrylate is added and the mixture is emulsified.

Feed 2

150 parts of water
6 parts of $K_2S_2O_8$.

Procedure

Polmerization is carried out at 80°C. When the batch has reaches 80°C, 5% of feed 1 is added and polymerization is started over 15 minutes. Then the remainder of feed 1 is added over 2.5 hours and feed 2 over 2.75 hours. Polymerization is then completed over the next 1.25 hours, Finally, the mixture is cooled and adjusted to pH 6.5 with $NH_3$. The K value (in cyclohexanone) is from 52 to 57.
Viscosities in poise, measured in a rotary viscometer with elements MV-II, velocity grade 162

| a | 19.6 |
|---|---|
| b | 39.2 |
| c | 59 |
| d | 154 |
| e | 195 |
| f | 272 |

The dispersions flow from a glass rod and are suitable as paints or as leather coatings.

EXAMPLE 3

Initial batch

| a | b | c | d | e | f | |
|---|---|---|---|---|---|---|
| 36 | 30 | 22.5 | 15 | 7.5 | 1.5 | parts of protective colloid B |
| 1.5 | 7.5 | 15 | 22.5 | 30 | 26 | parts of protective colloid D |

1.5 parts of carbon tetrachloride
525 parts of water
1.5 parts of $K_2S_2O_8$
The batch is adjusted to pH 6.5.

Feed 1

750 parts of vinyl acetate
750 parts of dibutyl maleate
22.5 parts of acrylic acid
1.88 parts of sodium vinylsulfonate
30.0 parts of emulsifier II
22.5 parts of emulsifier V
948 parts of water.

The mixture is first neutralized to pH 7.0 with concentrated $NH_3$ without the two esters, whereupon the vinyl acetate and dibutyl maleate are added and the mixture is emulsified.

Feed 2

150 parts of water
6 parts of $K_2S_2O_8$.

Procedure

Polymerization is carried out at 75°C. When the batch has reached 75°C, 0.5% of feed 1 is added and polymerization is started over 5 minutes. Then the remainder of feed 1 is added over 3.5 hours and feed 2 over 3.75 hours. Polymerization is then completed over the next 1.25 hours, before the mixture is cooled and adjusted to pH 6.5 with concentrated $NH_3$. The K value (in cyclohexanone) is between 40 and 48.
Viscosities in poise, measured in a rotary viscometer with elements MV-II, velocity grade 162

| a | 55 |
|---|---|
| b | 101 |
| c | 117 |
| d | 180 |
| e | 240 |
| f | 320 |

The dispersion flow from a glass rod and are suitable as wood glues and general adhesives.

EXAMPLE 4

Initial batch

| a | b | c | |
|---|---|---|---|
| 14.25 | 12 | 9 | parts of protective colloid B |
| 0.75 | 3 | 6 | parts of protective colloid D |

0.3 part of t-dodecyl mercaptan
525 parts of water
1.5 parts of $K_2S_2O_8$.
The batch is adjusted to pH 6.5.

Feed 1

600 parts of styrene
900 parts of 2-ethylhexyl acrylate
22.5 parts of acrylic acid
1.88 parts of sodium vinylsulfonate
30 parts of emulsifier II
22.5 parts of emulsifier IV
1.5 parts of t-dodecyl mercaptan
925.5 parts of water.

The mixture is first neutralized to pH 7.0 with concentrated $NH_3$ without the styrene and ethylhexyl acrylate, whereupon these latter compounds are added and the mixture is emulsified.

Feed 2

6 parts of $K_2S_2O_8$
150 parts of water.

Procedure

All tests are carried out at 75°C. When the initial batch has reached 75°C, 0.5% of feed 1 is added and polymerization is started over 5 minutes. Then the remainder of feed 1 is added over 3.5 hours and feed 2 over 3.75 hours. Polymerization is then completed over the next 1.25 hours. The mixture is then cooled and adjusted to pH 6.5 with concentrated $NH_3$.

Viscosities in poise, measured in a rotary viscometer with elements MV-II, velocity grade 162

| | |
|---|---|
| a | 92 |
| b | 199 |
| c | 360 |

The dispersions flow from a glass rod.

EXAMPLE 5

Initial batch

| a | b | c | |
|---|---|---|---|
| 36 | 22.5 | 7.5 | protective colloid A |
| 1.5 | 15 | 30 | protective colloid D |

525 parts of water
1.5 parts of $K_2S_2O_8$.
The batch is adjusted to pH 6.5.

Feed 1

450 parts of vinyl acetate
1050 parts of ethylhexyl acrylate
37.5 parts of acrylic acid
37.5 parts of emulsifier I
7.5 parts of emulsifier V
2.25 parts of t-dodecyl mercaptan
881.5 parts of water.

This mixture is first neutralized to pH 7.0 with concentrated $NH_3$ without the vinyl acetate and ethylhexyl acrylate, whereupon these latter compounds are added and the mixture is emulsified.

Feed 2

7.5 parts of $K_2S_2O_8$
225 parts of water.

Procedure

Polymerization is carried out at 80°C. When the initial batch has reached 80°C, 0.5% of feed 1 is added and polymerization is started over 5 minutes. Then the remainder of feed 1 is added over 3 hours and feed 2 over 3.25 hours. Polymerization is then completed over the next 1.25 hours. The mixture is then cooled and adjusted to pH 6.5 with concentrated $NH_3$. The K value (in cyclohexanone) is between 42 and 48.

Viscosities in poise, measured in a rotary viscometer with elements MV-II, velocity grade 162

| | |
|---|---|
| a | 13.2 |
| b | 105 |
| c | 206 |

The dispersions flow from a glass rod and are suitable for coating sheet material.

EXAMPLE 6

Initial batch

| a | b | c | d | |
|---|---|---|---|---|
| 33 | 31.5 | 30 | 28.5 | parts of protective colloid B |
| 4.5 | 6 | 7.5 | 8 | parts of protective colloid D |

1.5 parts of carbon tetrachloride
525 parts of water
1.5 parts of $K_2S_2O_8$
This batch is adjusted to pH 6.5.

Feed 1

900 parts of vinyl acetate
600 parts of n-butyl acrylate
30 parts of acrylic acid
1.88 parts of sodium vinylsulfonate
30 parts of emulsifier I
30 parts of emulsifier V
963 parts of water This mixture is first neutralized without the vinyl acetate and butyl acrylate using concentrated $NH_3$ to a pH of 7.0. Vinyl acetate and butyl acrylate are then added and the mixture is emulsified.

Feed 2

6 parts of $K_2S_2O_8$
150 parts of water.

Procedure

Polymerization is carried out at 75°C. When the initial batch has reached 75°C, 0.5% of feed 1 is added and polymerization is started over 5 minutes. Then the remainder of feed 1 is added over 3.5 hours and feed 2 over 3.75 hours. Polymerization is then completed over 1.25 hours before the mixture is cooled and adjusted to pH 6.5 with concentrated $NH_3$. The K value (in cyclohexanone) is between 57 and 63.

Viscosities in poise, measured in a rotary viscometer with elements MV-II, velocity grade 162

| | |
|---|---|
| a | 32.5 |
| b | 60 |
| c | 117 |
| d | 141.2 |

The dispersions flow from a glass rod and are suitable for coating textiles.

EXAMPLE 7

Initial batch

| a | b | c | d | |
|---|---|---|---|---|
| 43.5 | 15 | 1.5 | 14.25 | parts of protective colloid B |
| 1.5 | 30 | 43.5 | 0.75 | parts of protective colloid E |

1.5 parts of carbon tetrachloride
525 parts of water
1.5 parts of $K_2S_2O_8$
The mixture is adjusted to pH 6.5.

Feed 1

900 parts of vinyl acetate
600 parts of n-butyl acrylate
15 parts of acrylic acid (only in tests, a, b and c)
1.88 parts of sodium vinylsulfonate
30 parts of emulsifier I
30 parts of emulsifier V
6 parts of butanedio-1,4 diacrylate (crosslinker)
963 parts of water.

This mixture is first neutralized without vinyl acetate and butyl acrylate using concentrated $NH_3$ to give a pH of 7.0. The vinyl acetate and butyl acrylate are then added and the mixture is emulsified.

Feed 2

150 parts of water
6 parts of $K_2S_2O_8$.

Procedure

Polymerization is carried out at 75°C. When the initial batch has reached 75°C, 0.5% of feed 1 is added and polymerization is started over 5 minutes. Then the remainder of feed 1 is added over 3.5 hours and feed 2 over 3.75 hours. Polymerization is then completed over 1.25 hours. The mixture is then cooled and adjusted to pH 6.5 with concentrated $NH_3$. The polymer crosslinks and is therefore not completely soluble in any solvent.

Viscosities in poise, measured in a rotary viscometer with elements MV-II, velocity grade 162

| | |
|---|---|
| a | 26 |
| b | 73 |
| c | 167 |
| d | 80.8 |

The dispersions obtained in tests a, b and c flow from a glass rod. Dispersion d does not flow from a glass rod, this being due to the absence of acrylic acid.

In general, the flowability of the dispersion may be raised by copolymerizing monoolefinically unsaturated carboxylic acids or raising the amount thereof. This Example also shows that the viscosity is reduced by including or raising the amount of monoolefinically unsaturated carboxylic acid (in this case acrylic acid), which can be compensated for by altering the ratio and/or amount of protective colloids.

EXAMPLE 8

Initial batch

| a | b | c | d | e | |
|---|---|---|---|---|---|
| 45 | 45 | 45 | 45 | 45 | parts of protective colloid B |
| 0.75 | 3 | 6 | 12 | 18 | parts of protective colloid D |

525 parts of water
1.5 parts of $K_2S_2O_8$
The mixture is adjusted to ph 6.5.

Feed 1

1.200 parts of vinyl acetate
300 parts of 2-ethylhexyl acrylate
22.5 parts of acrylic acid
45 parts of emulsifier I
7.5 parts of emulsifier V
962 parts of water This mixture is first neutralized without the two esters using concentrated $NH_3$ to give a pH of 7.0. The vinyl acetate and 2-ethylhexyl acrylate are then added and the mixture is emulsified.

Feed 2

150 parts of water
6 parts of $K_2S_2O_8$.

Procedure

Polymerization is carried out at 75°C. When the batch has reached 75°C, 2% of feed 1 is added and polymerization is started over 10 minutes. Then the remainder of feed 1 is added over 3.5 hours and feed 2 over 3.75 hours. Polymerization is then completed over 1.25 hours. The mixture is then cooled and adjusted to pH 6.5 with concentrated $NH_3$.

Viscosities in poise, measured in a rotary viscometer with elements MV-II, velocity grade 162

| | |
|---|---|
| a | 6,63 |
| b | 43,1 |
| c | 82,8 |
| d | 277 |
| e | 533 |

All dispersions flow from a glass rod and are suitable for use in paints.

We claim

1. In a process for the manufacture of an aqueous dispersion of a copolymer of olefinically unsaturated monomers of which at least 40% consist of a monoolefinically unsaturated carboxylic acid ester by the emulsion copolymerization of said monomers dispersed in water, the improvement which comprises carrying out said emulsion copolymerization in an emulsifier/protective colloid system consisting essentially of
   a. from 0.5 to 7% of a non-ionic emulsifier,
   b. from 0.05 to 5% of an anionic emulsifier,
   c. from 0.01 to 5% of a protective colloid which is a polymer of N-vinylpyrrolidone containing at least 20% by weight of polymerized units of vinyl pyrrolidone, and
   d. from 0.01 to 7% of a hydroxyl-containing protective colloid selected from the group consisting of polyvinyl alcohols, water-soluble and partially saponified vinyl acetate polymers, carboxymethyl celluloses and hydroxyethyl celluloses, said percentages of said emulsifiers (a) and (b) and said protective colloids (c) and (d) being by weight of the total weight of monomers.

2. A process as claimed in claim 1 wherein the protective colloid components (c) and (d) consist of at least 30% of their weight of polymerized units of N-vinylpyrrolidone.

3. A process as claimed in claim 1 wherein the monomers being copolymerized contain from 50 to 99% by weight of said monoolefinically unsaturated carboxylic acid ester.

4. A process as claimed in claim 3 wherein said monoolefinically unsaturated carboxylic acid ester contains from 3 to 20 carbon atoms and is selected from the group consisting of vinyl esters of a saturated carboxylic acid and the acrylic and methacrylic acid esters of $C_{1-18}$ alkanols.

5. A process as claimed in claim 1 wherein the monomers being polymerized include from 0.5 to 15% by weight of total monomer of an unsaturated carboxylic acid selected from the group consisting of acrylic acid, methacrylic acid, crotonic acid, maleic acid, fumaric acid and itaconic acid.

6. A process as claimed in claim 1 wherein the non-ionic emulsifier (a) is an ethoxylated compound selected from the group consisting of fatty alcohols, fatty amines, fatty acid amides and monoalkyl phenols containing $C_{8-12}$ alkyl groups.

7. A process as claimed in claim 1 wherein the anionic emulsifier (b) is selected from the group consisting of sulfuric acid esters of fatty alcohols, sulfonation products of ethoxylated alkyl phenols containing $C_{8-12}$ alkyl groups and water-soluble alkali metal salts of fatty acids.

8. A process as claimed in claim 1 wherein component (c) is an N-vinylpyrrolidone polymer having a K-value of 30 to 150 and containing 40 to 100% by weight of polymerized units of vinylpyrrolidone.

9. A process as claimed in claim 1 wherein the emulsion copolymerization is carried out at a temperature of about 40°C. to 90°C. and at a pH of about 2.5 to 7.

* * * * *